United States Patent [19]

Zickell et al.

[11] Patent Number: 4,992,315
[45] Date of Patent: Feb. 12, 1991

[54] ROOFING MEMBRANE AND METHOD

[75] Inventors: Thomas J. Zickell, Stratham, N.H.; Steven C. Bettoli, Bound Brook, N.J.

[73] Assignee: GAF Buildinhg Materials Corp., Wayne, N.J. ; a part interest

[21] Appl. No.: 434,384

[22] Filed: Nov. 13, 1989

[51] Int. Cl.⁵ .......................... B32B 7/12; B32B 5/16; B32B 25/02

[52] U.S. Cl. ...................................... 428/41; 428/141; 428/143; 428/195; 428/206; 428/352; 428/354; 428/489

[58] Field of Search .................... 428/40, 41, 141, 143, 428/195, 194, 352, 354, 206, 489

[56] References Cited

U.S. PATENT DOCUMENTS 4,317,853  3/1982  Thiis-Evensen .................... 428/354
4,559,267  12/1985  Freshwater et al. ................ 428/354

Primary Examiner—Alexander S. Thomas
Attorney, Agent, or Firm—Julius Fisher; Jules E. Goldberg; Joshua J. Ward

[57] ABSTRACT

A bituminous roofing membrane, and method of manufacture, is disclosed having a reinforcing mat sandwiched between top and bottom layers of a tacky polymer modified bitumen. The leading edge portion of the top layer is provided with a layer of roofing granules. A track of adhesive is provided on the roofing granules. The trailing edge portion of the top layer is provided with a layer of non-slip plastic film. A release sheet is applied to the bottom layer of the membrane to prevent engagement of the top and bottom layers with one another when the membrane is rolled for storage or shipment. In use, upon removal of the release sheet, the membrane is secured to the roof with the leading edge portion constituting a starter strip for receiving thereon the first row of roofing shingles, and the trailing edge portion constituting an underlayment for receiving thereon successive rows of roofing shingles.

8 Claims, 3 Drawing Sheets

ROOFING MEMBRANE AND METHOD

BACKGROUND OF THE INVENTION

I. Field of the Invention

This invention relates to membranes adapted for the waterproofing and sealing of substrate structures, particularly in roofing applications, and to the method of manufacturing such membranes. More particularly, this invention relates to waterproofing membrane laminates having a leading edge portion which constitutes a starter strip for receiving thereon the first row of roofing shingles, and a non-slip trailing edge portion which constitutes an underlayment for receiving thereon successive rows of roofing shingles.

II. Description of the Prior Art

Bituminous prepared roofing, also referred to as asphalt roofing membrane, is typically manufactured using as a base a fibrous web, and coating or impregnating one or both surfaces of the web with a weather-resistant bituminous coating material. Usually, there is applied to the bituminous coating, on the surface intended to be exposed to the weather, a suitable granular, material such as slate granules or mineral surfacing. A release sheet, such as siliconized paper, is applied against the self-adhesive bituminous waterproofing layer to prevent sticking of adjacent sections of the roofing material in the package.

In a typical installation, an underlayment is first applied to the plywood deck of the roof. The underlayment may take the form of a fibrous mat also impregnated with a bituminous material, and useful as a waterproofing member. The roofing shingles are applied on top of the underlayment with the seams of adjacent rows in off-set relation. In practice, a starter row or strip is begun at the roof eaves using self-sealing shingles. The end of the first shingle in the strip is trimmed such that in the placement thereof on the deck, the cutouts of the first course of shingles will not be placed over the starter strip joints. The starter strip also is nailed to the eaves. Successive rows of shingles are then secured to the deck or roof in conventional manner using sealants or nails.

To insure maximum protection against ice dams, flashing should be installed wherever there is a possibility of icing, such as along the eaves of the roof. Ice dams are formed by the continual thawing and freezing of melting snow, or the backing up of frozen slush in gutters which force water under the roofing thereby causing damage to a home's ceilings, walls, and insulation. This problem is most acute on low slope roofs; that is, roofs with a slope of 2 inches (5.08 cm) to 4 inches (10.16 cm) per foot (30.48 cm). Eaves flashing is the recommended method of applying roofing material to this potentially vulnerable area to help prevent such leakage. The flashing is positioned over the underlayment and nailed in place ready to receive thereon the starter strip.

The traditional eaves flashing have been either 50 pound coated felt or two layers of 15 pound saturated felt cemented together. The term "pound" is defined as the weight of the felt in covering an area of 108 square feet. The asphalt used in the 50 pound felt is not modified with rubber, and after aging, will not form a good seal around nails. The installation of two layers of 15 pound saturated felt is time consuming.

As is apparent, the need for a starter strip and for flashing involves two separate elements which are installed separately, thus increasing installation time. Also, the use of an ice dam barrier, such as flashing, tends to be slippery when standing upon. This creates a safety hazard for the installer.

The present invention combines the separate functions of a starter strip and eaves flashing into a single roofing membrane, and incorporates a nonslip safety feature as part of the membrane in the manner hereinafter described.

SUMMARY OF THE INVENTION

The invention provides for a bituminous selfadhering waterproof roofing membrane, and to the method of manufacturing such membrane, having a reinforcing mat sandwiched between top and bottom layers of a tacky polymer modified bitumen to form oppositely exposed surfaces of the membrane. The expose surface of the bottom layer constitutes a non-weather surface adapted to be secured to the roof. The exposed surface of the top layer has a leading edge portion and a trailing edge portion. The leading edge portion of the top layer is provided with a protective layer of roofing granules which constitute a weather exposed surface. A track of pressure sensitive adhesive is provided on the roofing granules, extending in the same general direction as the leading edge, and spaced inwardly of the leading edge. The exposed surface of the trailing edge portion of the top layer is formed having a layer of non-slip plastic film. In use, when the membrane is secured to the roof, the leading edge portion of the top layer constitutes a starter strip for receiving thereon the first row of roofing shingles, while the trailing edge portion constitutes an underlayment for receiving thereon successive rows of roofing shingles.

A release sheet is applied to the bottom layer of the membrane such that when the membrane is in a rolled state, the sheet comes in contact with the top layer to prevent engagement of the oppositely exposed surfaces of the membrane during storage or shipping.

Accordingly, it is an object, feature, and advantage of the present invention to provide a rubberized asphalt roofing product which is applied along the eaves of a roof, and has the dual purpose of serving as a water infiltration barrier and a starter strip for the first course of overlying shingles.

A further object, feature, and advantage of the present invention is to provide a roofing membrane as described above having a non-slip surface for the safety of roof installers.

Another object and feature of the present invention is to provide a novel method for manufacturing a roofing membrane.

A further object, feature, and advantage of the present invention is to provide a roof membrane and eave underlayment which reduces labor cost in installation, reduces scrap in the trimming of shingles, and reduces the usage of nails, all of which contributes to a more simplified, safer, and economical roof installation.

Additional features and advantages of the present invention will become more apparent from a consideration of the following detailed description when taken in conjunction with the accompanying drawings.

DESCRIPTION OF THE PREFERRED EMBODIMENT

Figure 1:
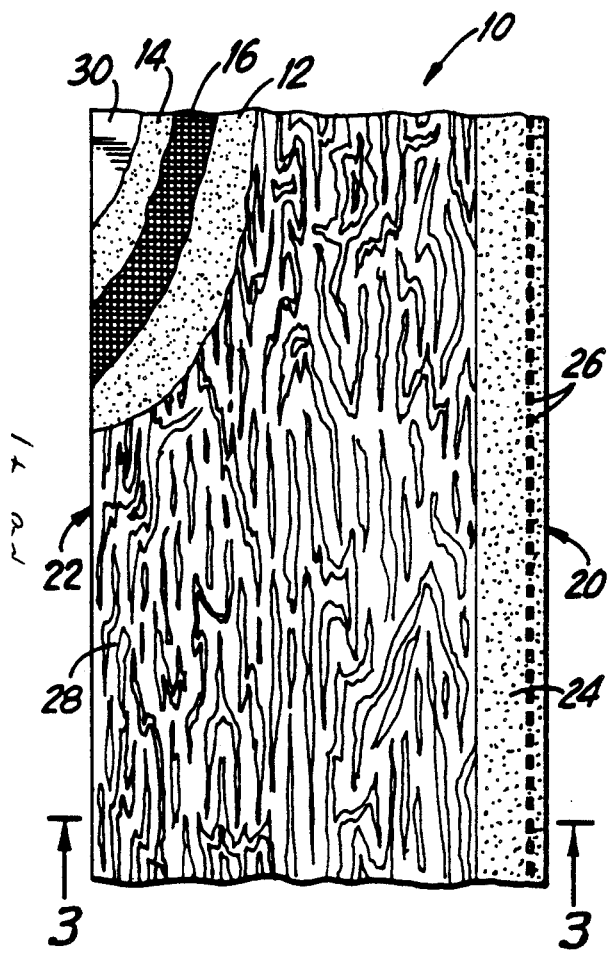
FIG. 1 is a top plan view of the roofing membrane constructed in accordance with the present invention prior to being secured to the roof.

Referring to the drawings, numeral 10 represents a bituminous self-adhesive waterproofing membrane constructed in accordance with the present invention. Membrane 10 is made with an asphalt coating that has been rubberized with polymer so that a seal forms around roofing nail punctures.

Specifically, membrane 10 includes a top layer 12 and a bottom layer 14, each made of sticky and rubbery polymer modified bitumen. Sandwiched between the tacky bitumen layers 12 and 14 is a reinforcing mat layer 16 preferably made of a fiberglass substrate. Alternatively, the reinforcing mat layer 16 may be formed of polymeric materials, such as polyester. As will become hereinafter apparent, the exposed surface of bottom layer 14 is a non-weather surface adapted to be secured to the roof.

Figure 4:
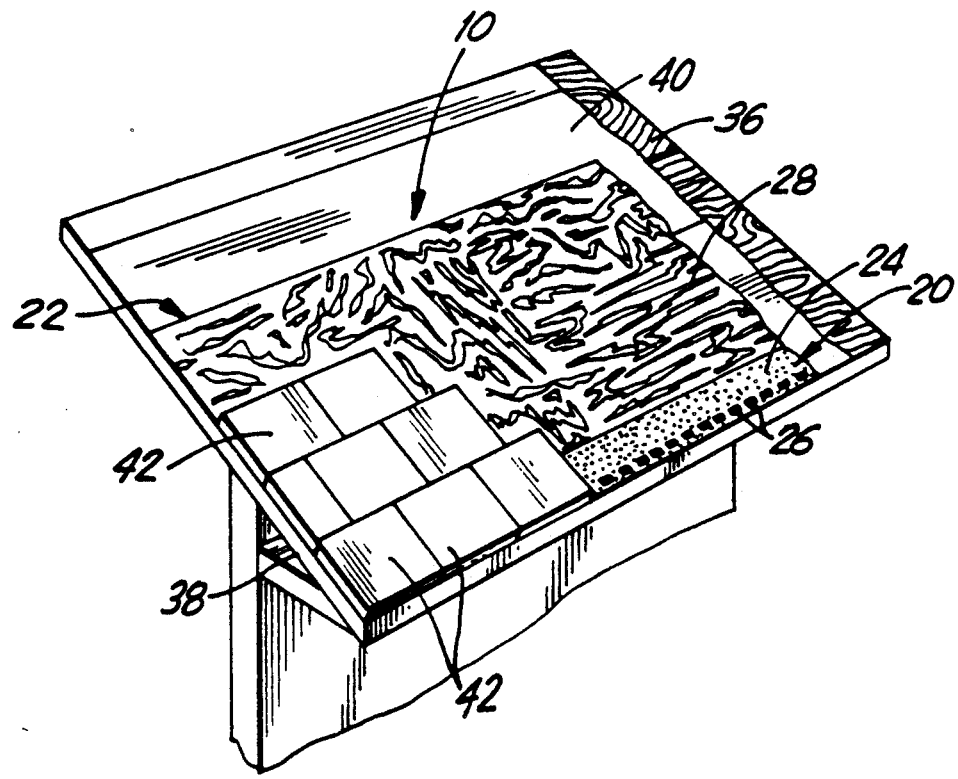
FIG. 4 is a perspective view of the eaves of the present invention secured thereto, and further showing a plurality of roof shingles secured in place on the membrane.
Figure 5:
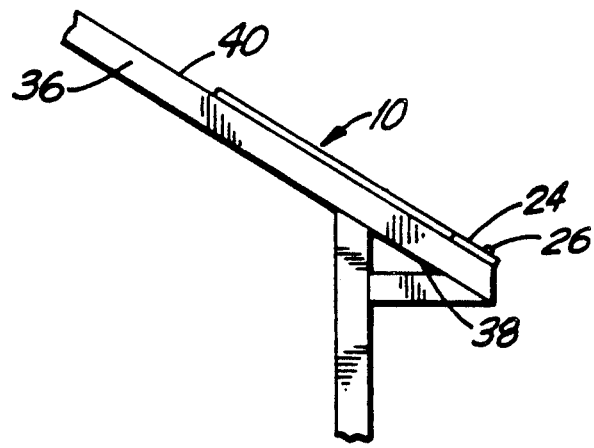
FIG. 5 is a side elevational view of the portion of the roof shown in FIG. 4, with the shingles removed for the purpose of clarity.

Positioned on top of the exposed surface of bottom layer 14 is a release sheet 18 of siliconized treated paper or plastic material. Membrane 10 is intended to be made in roll lengths of 36 feet (10.97 m) having a width of 3 feet (0.91 m). As such, the release sheet 18 comes in contact with the exposed surface of the top layer 12, or the elements affixed to said top layer as hereinafter noted, upon rolling of membrane 10, to prevent engagement of the oppositely exposed surfaces of the membrane during storage or shipping. Release sheet 18 is intended to be removed from bottom layer 14 when membrane 10 is secured to the roof, as shown in FIG. 4.

The exposed surface of top layer 12 may be defined as having a leading edge portion 20 and a trailing edge portion 22. These portions correspond to the leading edge and trailing edge portions of membrane 10. Positioned on top of leading edge portion 20, and embedded partially therein, is a protective layer of roofing granules 24 which constitute a weather exposed surface; that is, the surface exposed to weather conditions. The texture of the granules is such that the protective layer 24 closely resembles the exposed surface of roof shingles. The width of protective layer 24 is about 10% to 20% of the total width of membrane 10. Assuming a total width of 3 feet (0.91 m), the width of protective layer 24 is preferably 6 inches (15.24 cm). Protective layer 24 extends lengthwise for the entire length of the membrane.

Embedded within protective layer 24, and projecting slightly above the top surface thereof, is a track of pressure sensitive adhesive 26. The plurality of adhesive units 26 extend lengthwise of membrane 10 in a direction generally parallel to leading edge 20, and are spaced inwardly of said edge. Each adhesive unit 26 is of generally rectangular shape approximately 1.38 inches (3.51 cm) by 0.50 inches (1.27 cm), and is spaced from leading edge 20 by approximately 1.25 inches (3.18 cm) on center. The longitudinal spacing between successive adhesive units 26 is approximately 1.64 inches (4.17 cm). As hereinafter described, the portion of membrane 10 designated as protective layer 24 constitutes a starter strip for roof shingles which are held in place by adhesive 26 and by nails.

Positioned on top of trailing edge portion 22, and embedded partially therein, is a non-slip plastic sheet or film 28 of the kind disclosed in U.S. Pat. No 4,488,918 to Jarl-Erik Jofs dated Dec. 18, 1984. The sheet has, on its surface, a pattern of relatively high, sharp, irregular plastic peaks and ridges, sufficiently pronounced, hard and rough to effect a mechanical gripping with the sole of a workman's boot. This provides a safety feature for roof installers when the membrane 10 is secured as an underlayment to the deck of a roof for receiving shingles thereon.

Figure 2:
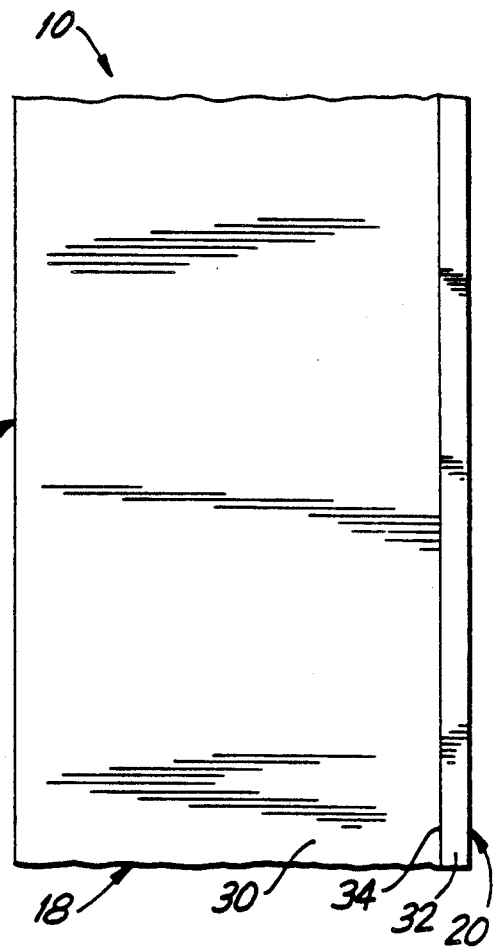
FIG. 2 is a bottom plan view of the roofing membrane shown in FIG. 1.
Figure 3:
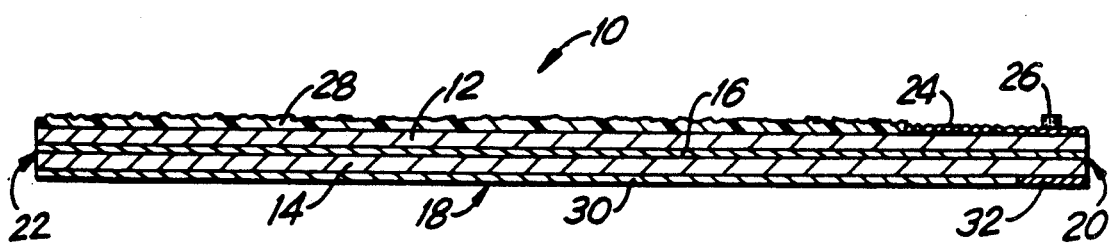
FIG. 3 is a sectional view taken along line 3—3 of FIG. 1.

Referring to FIGS. 2 and 3, release sheet 18 has a first portion 30 and a second portion 32. Portion 30 covers most of the exposed surface of bottom layer 14 beginning at trailing edge 22 and extending toward leading edge 20, but terminating short of said leading edge. Portion 30 is coated on only one side thereof. Portion 32 covers only a small portion of the exposed surface of bottom layer 14, beginning at leading edge 20 and continuing to where portion 30 had terminated thereby forming a juncture line 34. Portion 32 is coated on both sides thereof, and is of sufficient width to overlie adhesive 26 upon rolling of membrane 10. Portions 30 and 32 extend lengthwise for the entire length of membrane 10.

Release sheet 18 is preferably a single sheet having the two portions 30 and 32. In the alternative, release sheet 18 could be made of two separate sheets corresponding to the two portions. Also, in place of the siliconized coating on both surfaces of portion 32, the invention provides that the surface intended to come in contact with the adhesive track 26 may be coated with a wax emulsion or a soap solution.

FIG. 4 shows the manner in which membrane 10 is intended for use on roof deck 36 in the region of roof eaves 38. Deck 36 is typically provided with an underlayment layer 40 in conventional manner, such as by an adhesive and/or nails. Underlayment 40 provides a measure of protection against water leakage. However, as previously noted, such underlayment is not adequate along roofing eaves where eaves flashing is employed for added protection against ice dames.

In accordance with the present invention, the eaves flashing may be replaced with membrane 10. In use, after removal of release sheet 18, membrane 10 is secured to deck 36 by adhesive and/or nails. Membrane 10 is positioned with leading edge 20 aligned with the leading edge of the roof. This serves to locate the leading edge portion 20 in position to act as a starter strip for receiving thereon the first row of roofing shingles 42.

More specifically, shingles 42 are suitably positioned in overlying and sticking relation to adhesive 26, and secured in place to deck 36 by nails. Since the installer typically is standing on deck 36 while installing the shingles, there would be risk of slipping on conventional flashing. However, in the present installation using membrane 10, the installer would stand on the non-slip plastic sheet portion 28 of the trailing edge portion of the membrane to substantially reduce the risk of falling. The trailing edge portion 22 thus constitutes an underlayment, in and of itself, for receiving thereon successive rows of roofing shingles 42.

In construction, the modified bitumen coating is made of 0–40% mineral stabilizer and 5–15% styrene-butadiene copolymer with the balance being asphalt having a Ring and Ball softening point between 80° F. and 150° F. (26.67° C. and 65.56° C.). The finished weight of one square roll; that is, 108 square feet (10.04 m²) which is needed to cover 100 square feet (9.29 m²), will be in the range of 40 pounds to 60 pounds (18.14 kg to 27.22 kg).

The thickness of the finished membrane, less the release sheet, is between 90 mils and 110 mils for a granulated surface, and between 50 mils and 70 mils for a non-granulated surface. The thickness of the fiberglass mat is between 17 mils and 37 mils. The thickness of the release sheet, if paper, is between 3 mils and 8 mils. If the release sheet is made of plastic, the thickness is to be between 1 mil and 5 mils. The thickness of the non-slip film is between 2 mils and 20 mils.

Figure 6:
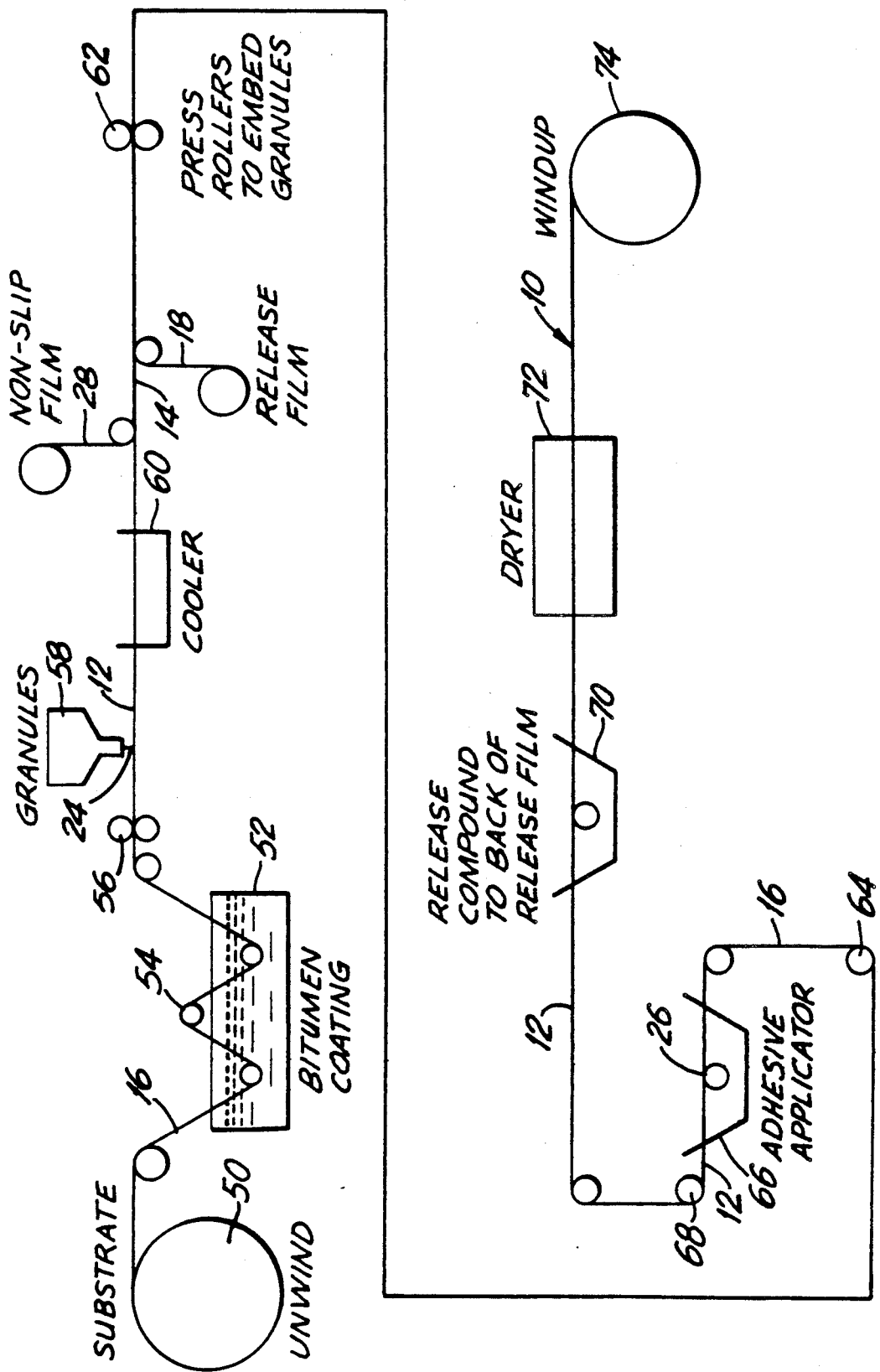
FIG. 6 is a schematic drawing of the process steps used in manufacturing the roofing membrane.

The process by which membrane 10 is formed is schematically depicted in FIG. 6. The substrate, such as the fiberglass mat 16, is unwound from spool 50 and passes through an impregnation tank 52, under the influence of guide rollers 54, where the molten bitumen coating is applied to impregnate the substrate. After substrate 16 passes through squeeze rollers 56, roofing granules 24 are dropped from tank 58 onto the tacky polymer modified bitumen representing the top layer 12 of the membrane, and stick to the substrate. As previously noted, the granules 24 are dropped onto that portion of the substrate that constitutes the leading edge portion 20 of membrane 10, in a band width of approximately 6 inches (15.24 cm).

The impregnated substrate 16 then passes through a cooling station, such as water bath 60, so that the substrate is at a suitable temperature to receive thereon the non-slip film or sheet 18 on that portion of top layer 12 constituting the trailing edge portion 22 of membrane 10. Substrate 16 then passes through another set of rollers where release sheet or film 18 is applied to the bottom layer 14 of the substrate. Substrate 16 then passes through a set of press rollers 62 where the roofing granules 24 are partially embedded into the top layer 12 of the membrane.

The position or travel of substrate 16 is then inverted, by suitable rollers 64, to permit the track of pressure sensitive adhesive 26 to be applied to the top layer 12 as the substrate passes, upside down, through the applicator station 66. The position or travel of substrate 16 is then again inverted, by rollers 68, to permit the substrate to pass, right side up, through another tank 70 wherein the siliconized coating is applied to the portion 32 of the exposed surface of release film 18. The substrate then passes through a drying station 72 after which the formed membrane 10 is wound up on take-off spool 74.

There is thus provided a novel roofing membrane which performs the dual function of serving as a water infiltration barrier and as the starter strip for receiving thereon the first course of roofing shingles, and which includes a non-slip surface for the safety of roof installers.

While a preferred embodiment of the invention has been shown and described in detail, it will be readily understood and appreciated that numerous omissions, changes, and additions may be made without departing from the spirit and scope of the invention.

We claim:

1. A bituminous roofing membrane comprising:
   first and second layers of a tacky polymer modified bitumen;
   a reinforcing mat layer sandwiched between and in contact with said first and second bitumen layers to form first and second oppositely exposed surfaces of said membrane;
   one of said first and second exposed surfaces constituting a non-weather surface adapted to be secured to the roof;
   the other one of said first and second exposed surfaces having a leading edge portion and a trailing edge portion;
   said leading edge portion having a protective layer of roofing granules constituting a weather exposed surface, and further having a track of pressure sensitive adhesive on said roofing granules extending in the same direction as said leading edge and spaced inwardly of said edge;
   the exposed surface of said trailing edge portion having a layer of non-slip plastic film;
   whereby when said membrane is secured to the roof, said leading edge portion constitutes a starter strip for receiving thereon the first row of roofing shingles, and said trailing edge portion constitutes an underlayment for receiving thereon successive rows of roofing shingles.

2. The roofing membrane claim 1 wherein said reinforcing mat layer is made of fibrous material.

3. The roofing membrane of claim 2 wherein said fibrous material is fiberglass.

4. The roofing membrane of claim 1 wherein said reinforcing mat layer is made of polymeric material.

5. The roofing membrane of claim 1 wherein said trailing edge portion of said other one of said first and second exposed surfaces has a width substantially greater than the corresponding width of said leading edge portion.

6. The roofing membrane of claim 5 wherein the width of said leading edge portion is about 10% to 20% of the total width of said membrane.

7. The roofing membrane of claim 1 further comprising a release sheet on said one of said first and second exposed surfaces of said bitumen layers; said release sheet intended to be removed from said membrane when the membrane is secured to the roof.

8. The roofing membrane of claim 7 wherein said release sheet has a first portion and a second portion; said second portion being adjacent to said first portion; one of said first and second portions having a leading edge aligned with the leading edge of said membrane and extending rearwardly toward the trailing edge of said membrane a distance sufficient to overlie said track of pressure sensitive adhesive on said roofing granules when said membrane is in a rolled condition; said one of said first and second portions of s id sheet being treated with a release film on opposite sides thereof.

* * * * *